US005787352A

United States Patent [19]
Benveniste

[11] Patent Number: 5,787,352
[45] Date of Patent: Jul. 28, 1998

[54] SYSTEM AND METHOD FOR MANAGEMENT OF NEIGHBOR-CHANNEL INTERFERENCE WITH POWER CONTROL AND DIRECTED CHANNEL ASSIGNMENT

[75] Inventor: Mathilde Benveniste, South Orange, N.J.

[73] Assignee: AT&T Corp., Middletown, N.J.

[21] Appl. No.: 581,694

[22] Filed: Dec. 29, 1995

[51] Int. Cl.$^6$ ...................................................... H04Q 7/00
[52] U.S. Cl. ............................ 455/452; 455/446; 455/63
[58] Field of Search ................................ 455/33.1, 13.1, 455/34.1, 63, 296, 38.3, 62, 69, 295, 446–452, 443; 379/59; H04Q 7/00

[56] References Cited

U.S. PATENT DOCUMENTS

| | | | |
|---|---|---|---|
| 5,038,399 | 8/1991 | Bruckert | 455/447 |
| 5,404,574 | 4/1995 | Benveniste | 455/447 |
| 5,483,667 | 1/1996 | Faruque | 455/447 |
| 5,491,837 | 2/1996 | Haartsen | 455/437 |
| 5,507,034 | 4/1996 | Bodin et al. | 455/452 |
| 5,513,379 | 4/1996 | Benveniste et al. | 455/451 |
| 5,539,728 | 7/1996 | Gaiani et al. | 455/67.1 |
| 5,579,373 | 11/1996 | Jang | 455/436 |
| 5,603,110 | 2/1997 | Heinzmann | 455/296 |
| 5,613,200 | 3/1997 | Hamabe | 455/450 |

OTHER PUBLICATIONS

Finean, "Channel Assignment in Mobile Satellite Networks", IEE Colloq. (1994) No. 82, 1994.

Raghvendra et al, "Channel Efficiency in Digital Cellular Communications Systems", Vehicular Technology, pp. 1005–1007, Feb. 1992.

Mundra et al, "Radio Frequency Interference–An Aspect for Designing a Mobile Radio Communications System", Vehicular Technology, pp. 860–865, Feb. 1992.

Kataoka et al, "Channel Information Assisted Reuse Partitioning", Universal Personal Comm., 1994, Int'l Conference, pp. 536–540, Apr. 1994.

Femenias et al, "Transmitter Power Control for DS/CDMA Cellular Mobile Radio Networks", Personal, Indoor and Mobile Radio Communications 1995 6th Symposium, vol. 1, IEEE, pp. 46–50, Jan. 1995.

Primary Examiner—Tommy P. Chin
Assistant Examiner—Vu Le
Attorney, Agent, or Firm—Alfred G. Steinmetz

[57] ABSTRACT

In a channel assignment system novel methodologies are utilized for managing channel interference in a cellular wireless communications system as a function of a service-quality factor for a communications channel within such a system. Those methodologies and their essential functions include: (1) Mixed Power Control for overcoming interference problems associated with conventional power control methods; (2) Directed Assignment for reducing channel conflicts between neighboring cells in non-congestion conditions; and (3) Mixed Power Control with Directed Assignment for reducing channel interference between neighboring cells.

15 Claims, 9 Drawing Sheets

FIG. 8A

| CELLS | A | B | C | D |
|---|---|---|---|---|
| # CALLS | 5 | 3 | 4 | 3 |
| | 1 | 2 | 3 | 4 |
| | 5 | 6 | 7 | 8 |
| | 9 | 10 | 11 | 12 |
| | 13 | 14 | 15 | 16 |
| | 17 | 18 | 19 | 20 |
| | 21 | 22 | 23 | 24 |
| # ACI COFLICTS | 4 | 3 | 3 | 3 |

FIG. 8B

| CELLS | A(+) | B(−) | C(+) | D(−) |
|---|---|---|---|---|
| # CALLS | 5 | 3 | 4 | 3 |
| | 1 | 2 | 3 | 4 |
| | 5 | 6 | 7 | 8 |
| | 9 | 10 | 11 | 12 |
| | 13 | 14 | 15 | 16 |
| | 17 | 18 | 19 | 20 |
| | 21 | 22 | 23 | 24 |
| # ACI COFLICTS | 2 | 2 | 1 | 1 |

5,787,352

1

SYSTEM AND METHOD FOR MANAGEMENT OF NEIGHBOR-CHANNEL INTERFERENCE WITH POWER CONTROL AND DIRECTED CHANNEL ASSIGNMENT

CROSS REFERENCE TO RELATED APPLICATIONS

This application is related to U.S. patent application Ser. No. 08/580,570, entitled "System and Method For Managing Neighbor Channel Interference In Channelized Cellular Systems" (M. BENVENISTE-7), and U.S. patent application Ser. No. 08/580,568 entitled "System and Method For Management of Neighbor Channel Interference With Cellular Reuse Partitioning", (M. BENVENISTE-8), said related applications being concurrently filed with the present application, having the same inventor, and being incorporated herein by reference.

BACKGROUND OF THE INVENTION

A. Field of the Invention

This application is related to wireless communications systems and more particularly to improved means for managing neighbor-channel interference in channelized cellular systems.

B. Background Art

In the art of wireless communications, considerations of spectral efficiency and maximization of available channels generally dictate the use of a cellular arrangement of such channels and the frequencies from which they are derived— i.e., a service area is partitioned into connected service domains known as cells. Within a particular cell, users communicate via radio links with a base station serving that cell, that base station being connected to base stations for other cells comprising a wireless communications network. That wireless communications network will, in turn, ordinarily be connected with one or more wired networks. To communicate using such a wireless network, each user is assigned one of a discrete set of channels.

A conventional regular hexagonal cell layout of a wireless cellular communications system is shown in schematic form in FIG. 1.[1] As is known, depicting the geographical service area in terms of a hexagonal grid establishes a geometric pattern that permits frequencies to be assigned in a patterned disposition allowing the reuse of those frequencies in a controlled repeatable regular assignment model. The cell areas each have specific channel sets assigned to them.[2] Each channel set comprises a plurality of individual transmit and receive radio channels for use within the cell area. In the model shown in FIG. 1, cells marked "A" are co-user cells and all use the same channel set. The same is true for co-user cells marked "B", "C" etc., each of which has its own assigned channel set.

[1]

It should be understood that the hexagonal shape of the cells depicted in FIG. 1 represents a drawing convention. Such a hexagonal cell representation has been chosen because it approaches a circular shape that is the ideal power coverage area for a cell. However, use of such circular shapes would involve overlapped areas and make a drawing of the served area unclear. With the hexagonal shaped cell convention, on the other hand, the plurality of cells representing a service area can be depicted with no gap and no overlap between cells.

[2]

Of course, as discussed more fully below, flexible channel assignment methodologies, which represent a relatively recent development in the wireless communications art, will generally involve non-fixed channel assignments within a cell.

Each cell is radiated by an antenna system associated with a base station, which base stations may be interconnected with each other and/or with other networks. An omnidirectional radiation pattern is depicted by antenna 101 and a directional antenna pattern, representing sectorization of cells into smaller wedge type service areas, is represented by antenna 102.

It is well known that a central aspect of cellular communications systems is the concept of frequency reuse. With frequency reuse, users in different geographical locations (different cells) may simultaneously use the same frequency channel, as depicted by commonly named cells in FIG. 1 for regular channel assignment. While frequency reuse can substantially increase spectral efficiency of a system, serious interference can occur between cells involved in the common use of the same channel in the absence of proper system design.

Frequency reuse assignments are generally implemented through the adoption of simple rules for identifying co-user cells and for partitioning the RF spectrum into channel sets. Channel assignment approaches can be broadly classified into two categories: fixed and flexible [See, M. Benveniste, "Self Configurable Wireless Systems", forthcoming]. Fixed channel assignment fixes the relationship between cells and the channels serving them. Only the channels allocated to a cell can serve calls in that cell, and each channel can be used simultaneously by all the cells to which the channel is assigned. An example of fixed channel assignment is "regular" channel assignment, which is characterized by equally-sized, regularly-spaced cells. Regular channel assignment is optimal for a system with traffic distributed uniformly across cells.

When the traffic distribution is not uniform, an optimal fixed "non-regular" channel allocation can be found, which allocates channels to cells according to their traffic load. [A process for achieving such an optimal non-regular allocation is described in M. Benveniste, "Apparatus and Method for Non-Regular Channel Assignment in Wireless Communication Networks", U.S. Pat. No. 5,404,574.]

Flexible channel assignment methods exploit the capability of a system for remote, software-driven, retuning of the base station radios, which capability enables channel capacity to adapt to traffic variation. The class of flexible channel assignment methodologies includes adaptive and dynamic channel assignment methods, and a hybrid of the two, adaptive-dynamic channel assignment [See, M. Benveniste, "Self Configurable Wireless Systems", id].

It is also well known that the quality of communication in wireless systems depends substantially on the ratio of the received signal to interference (S/I). The primary interference of concern consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. When the interfering neighbor channel is adjacent to the operating channel in the spectrum, the term adjacent-channel interference is generally used. To achieve the desired voice or data transmission quality, the ratio of the received signal over the combined co-channel and neighbor-channel interference must be above a specified threshold.

The need to avoid using neighbor channels within a cell and in neighbor cells has been well-recognized. In conventional channel assignment in analog AMPS systems, where three-sector cells re-use the spectrum in clusters of 7 cells, the spacing of 21 channels (630 kHz) between channels serving the same cell—as illustrated generally by the sectorized pattern of FIG. 2—has been more than adequate to render negligible any interference from neighbor channels. For physically contiguous cells, it is sufficient to avoid the assignment of adjacent channel sets to sectors of the same cell, or to sectors in such contiguous cells which would be contiguous to the sector under consideration. As can be seen in FIG. 2, such a channel assignment exists for the three-sector re-use group of size 7.

As less conventional channel assignment approaches, like flexible or non-regular fixed channel assignment, are pursued, however, such near automatic satisfaction of channel spacing requirements no longer occurs. There the cellular system designer faces the question: what is the minimum spectrum separation required between channels used simultaneously in a cell, or in neighboring cells. The approaches which have been proposed for answering this question do not consider neighbor-channel interference adequately, if at all.[3'] In particular, prior treatment of neighbor-channel interference, and the derivation of channel spacing requirements, has not considered the overall impact on the S/I ratio [See: W. C. Y. Lee, *Mobile Cellular Telecommunications Systems*, McGraw-Hill, New York, 1989]. Such failure to consider the impact of neighbor-channel interference on the S/I ratio will result in a signal that is weaker than the interference. By balancing the relative strength of an interfering signal located near the receiver with the signal strength drop caused by channel separation, the resulting S/I ratio would be equal to 1 (0dB) in the absence of co-channel interference. If some co-channel interference were present, the resulting S/I ratio would be less than 1 (negative, when expressed in dB).

[3'] Examples of such prior approaches appear in the following references: N. Bambos and G. J. Pottie, "On power control in high capacity radio networks", *Third WINLAB Workshop*, pp. 239–247, 1992; R. Beck and H. Panzer, "Strategies for Handover and Dynamic Channel Allocation in Micro-Cellular Mobile Radio Systems", *Proc. IEEE Vehicular Technol. Conference*, May 1989; D. C. Cox and D. O. Reudink, "Dynamic Channel Assignment in Two-Dimensional Large-Scale Mobile Radio Systems", *Bell System Technical Journal*, Vol. 51, No. 7, pp.1611–1629, September 1972; S. M. Elnoubi, R. Singh, and S. C. Gupta, "A new frequency channel assignment algorithm in high communication systems", *IEEE Trans. Veh. Technol*, Vol. 31, No. 3, August 1982; G. J. Foschini and Z. Miljanic, "A simple distributed autonomous power control algorithm and its convergence", *IEEE Trans. Veh. Technol.*, November 1993; H. Jiang and S. S. Rappaport, "CBWL: A new channel assignment and sharing method for cellular communication systems", *IEEE Veh. Technol. Conference*, May 1993; T. J. Kahwa and N. D. Georganas, "A hybrid channel assignment scheme in large-scale, cellular-structured mobile communication systems", *IEEE Trans. Commun.*, Vol. 26, No. 4, April 1978; S. Nanda and D. J. Goodman, "Dynamic Resource Acquisition: Distributed Carrier Allocation for TDMA Cellular Systems", *Third Generation Wireless Information Networks*, S. Nanda and D. J. Goodman (eds), pp. 99–124, Kluwer Academic Publishers, Boston, 1992; R. J. Pennotti, *Channel Assignment in Cellular Mobile Communication Systems*, Ph.D. Dissertation, Polytechnic Institute of New York, 1976; J. Zander, "Transmitter power control for co-channel interference management in cellular systems", *Fourth WINLAB Workshop*, pp. 241–247, 1993.

Since the S/I requirement implies a restriction on total interference, and total interference is the sum of two terms (co-channel plus neighbor-channel interference), there is a trade-off between them. Neighbor-channel interference decreases when there is a larger frequency-spectrum separation between channels, thus leaving a greater margin for co-channel interference. A lesser re-use distance is thus allowed, and the system capacity is higher, at least in principle. A larger channel separation, however, makes fewer channels available in each cell, which would lead to a capacity decrease if everything else stayed the same. Thus an important objective of the system designer would be a determination of the optimal channel separation for which the S/I requirement is met, and spectrum utilization is maximum.

SUMMARY OF THE INVENTION

This invention provides novel methodologies for managing neighbor channel interference in a cellular wireless communications system as a function of a service-quality factor for a communications channel within such a system. The novel methodologies for managing neighbor-channel interference which are disclosed herein, each of which represents an embodiment of the invention, include:

Mixed Power Control—for overcoming interference problems associated with conventional power control methods;

Directed Assignment—for reducing neighbor-channel conflicts between neighboring cells in non-congestion conditions; and Mixed Power Control with Directed Assignment—for reducing neighbor-channel interference between neighboring cells.

BRIEF DESCRIPTION OF THE DRAWINGS

FIG. 8 depicts an example of the Directed Assignment methodology of the invention.

DETAILED DESCRIPTION

The discussion following will be presented partly in terms of algorithms and symbolic representations of operations on data within a computer system. As will be understood, these algorithmic descriptions and representations are a means ordinarily used by those skilled in the systems engineering arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

For clarity of explanation, an illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, some or all of the functions of the "OMC", "MSCs", and "BSs" presented in FIGS. 3 and 4, as well as the "Computer Processor" of FIG. 4, may be provided by one or more processors, including shared processors. (Use of the term "processor" should not be construed to refer exclusively to hardware capable of executing software.)

Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1:
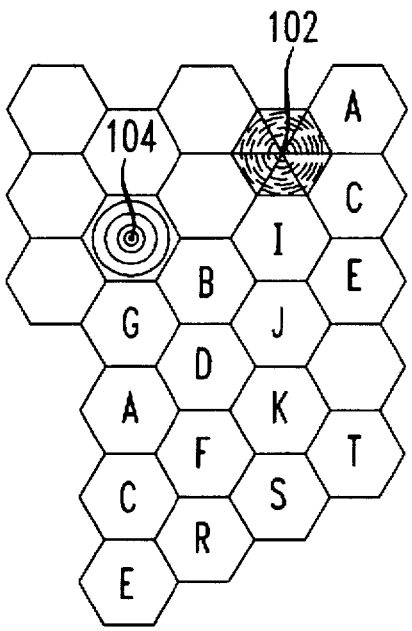
FIG. 1 depicts a schematic diagram of a regular cell layout for a wireless cellular communications system.
Figure 2:
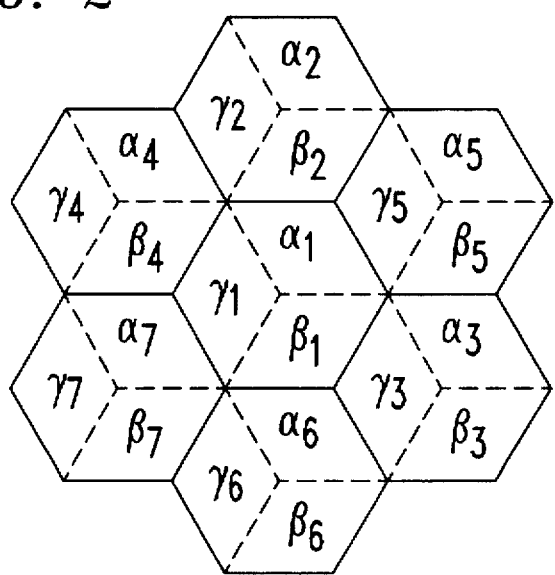
FIG. 2 depicts a sectorized cell arrangement based on a re-use factor of 7.
Figure 3:
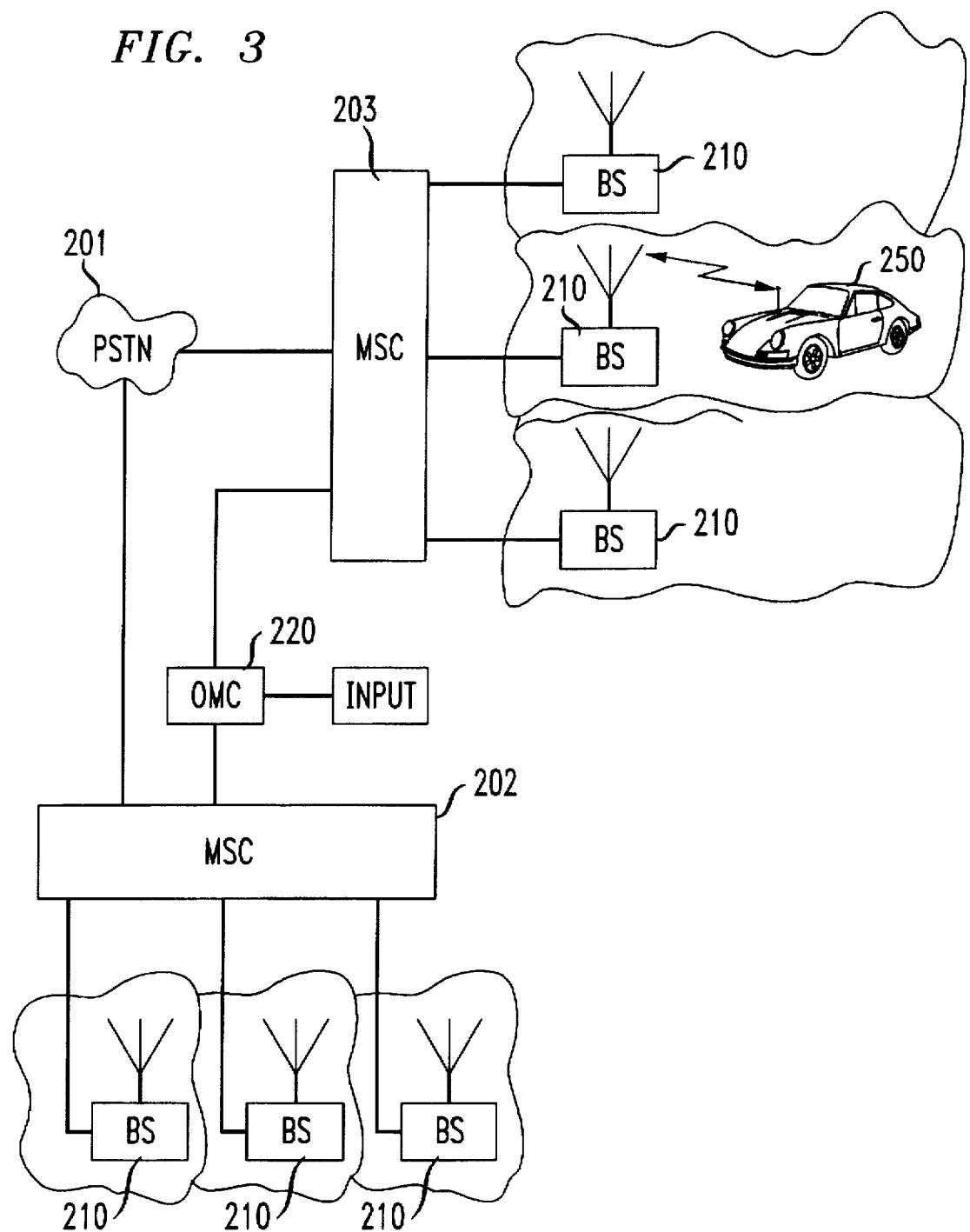
FIG. 3 shows in block diagram form the major elements of a wireless cellular communications system and the typical interconnections among such elements.

A typical cellular system is shown in the block diagram of FIG. 3. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radio telephoned 250 within its cell coverage area.

An operation and management center (OMC) 220 is coupled to the MSCs 202 and 203 to control their system operation and their associated BSs 210. OMC 220 is a central control station which includes data processing and input for accepting data input from data storage and real time control. In the case of flexible channel assignment, this data processing arrangement may be utilized in implementing channel arrangements in combination with remotely tunable radio transceivers located at the BSs.

Figure 4:
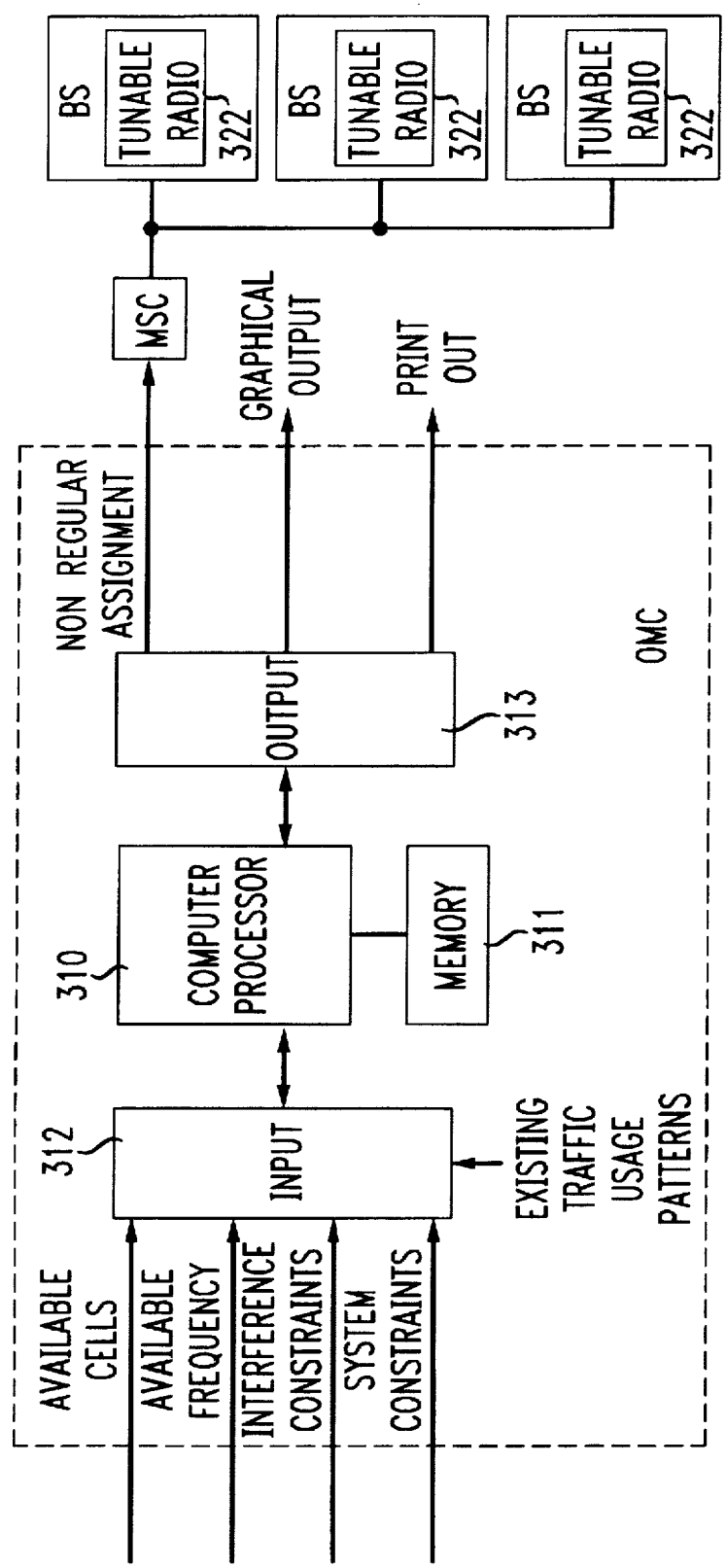
FIG. 4 shows a schematic block diagram of a data processing system for controlling the assignment of radio channels to various cells of a wireless cellular communications system using a flexible channel assignment methodology.

For such a flexible channel assignment case, an illustrative embodiment of data processing equipment included in the OMC for controlling the assignment and tuning of radio transceivers at the BSs is shown in schematic block diagram form in FIG. 4. A Computer Processor 310 has a stored program included in an associated Memory 311. This program may include instructions for performing the assignment of radio channels to a cellular system. Initial input data is supplied through the Input function 312 to the Computer Processor 310. Inputs include: the available cells, available radio frequencies, and interference information, usually in the form of a cell-to-cell interference matrix which defines the interference to each cell from every other cell. Further inputs include system constraints necessary for the desired channel assignment and traffic usage patterns.

To implement a flexible channel assignment methodology, the channel assignment process will be performed by Computer Processor 310 according to the instructions contained in Memory 311. The resulting channel assignments may be output via the Output function 313 to the MSC 315, from which they may be forwarded to the BSs 321. The individual tunable radios 322 included in the BSs may then be tuned to the proper frequencies in accord with the assignment of radio channels determined by the assignment process.

I. METHODOLOGY OF INVENTION

A. General

The methodology for the invention herein is presented in a plurality of embodiments, each directed to a novel method for managing neighbor channel interference toward the achievement of an overall S/I ratio goal. As will be apparent from the specific discussion of those embodiments, each embodiment may be implemented independently, but most are also capable of being implemented in combination with one or more other embodiments, as well as with embodiments of the methodologies disclosed in the cross-referenced companion applications.

The level of interference contributed by neighbor channel transmitters depends on the position of the subscriber units (generally, mobile or portable) relative to their base station (s), the level of power control exercised, and the direction of communication—i.e., whether transmission occurs from the base station to the subscriber unit (referred to herein as "down link"), or from the subscriber unit to the base station (referred to herein as "up link"). FIGS. 5 and 6 illustrate exemplary configurations for consideration of the impact of neighbor-channel interference. FIG. 5 illustrates a single cell with base station B, while in FIG. 6, two neighboring cells are illustrated, with base stations $B_1$ and $B_2$. In both figures, subscriber stations i and j are shown juxtaposed in various configurations relative to one another and to the base station (s). In all configurations the designation i indicates the serving subscriber unit, and the designation j indicates the subscriber unit operating on the nearest channel in the frequency spectrum, referred to as the neighbor channel. In the configurations of FIG. 6, serving subscriber unit i is served by base station $B_1$ and neighbor-channel subscriber unit j is served by base station $B_2$.

Figure 5A:
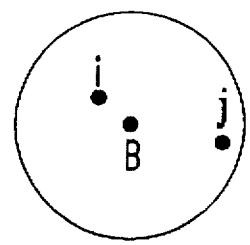
FIG. 5 illustrates schematically a single cell including its base station, with a served subscriber station and a potentially interfering subscriber station juxtaposed at various positions relative to each other and to the base station.
Figure 5B:
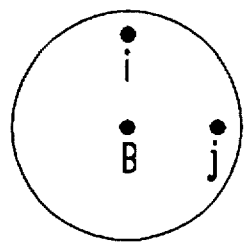
Figure 5C:
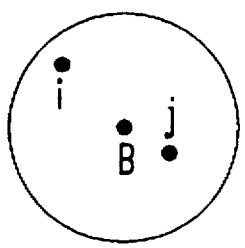

As an illustrative case, consider that all calls are served with equal power—i.e., no power control. Accordingly, down link neighbor-channel interference will be comparable in all the cases illustrated in FIG. 5 since all calls are served with the same power. The up link neighbor-channel interference, however, will be different in the three cases illustrated in FIG. 5. Because of signal attenuation as distance increases between transmitter and receiver, the signal strength received from subscriber unit i in FIG. 5(a) is stronger (due to its proximity to the serving base station) than the interfering signal from subscriber unit j. Hence up-link neighbor-channel interference for this configuration will be negligible. In the configuration of FIG. 5(b) the received serving signal is comparable to the interfering signal since the two subscriber units are the same distance from the base station. Finally, in the configuration of FIG. 5(c), up-link neighbor-channel interference is high because the interfering subscriber unit is closer to the base station than the serving subscriber unit.

If power control is used to reduce the power of calls closer to the base station, the experienced neighbor-channel interference changes. These changes can be illustrated by again considering the configurations of FIG. 5 and now assuming that power is adjusted so as to equalize the received serving signals. Then, up-link neighbor-channel interference would be comparable in all three configurations of FIG. 5 because the signal received from all subscriber units is the same, regardless of position of the unit relative to the base station. On the other hand, down-link neighbor-channel interference will be different for each of the three configurations. Power control causes down-link neighbor-channel interference to increase in FIG. 5(a) since the power of the interfering signal is higher than that of the serving signal. Power control does not alter down-link neighbor-channel interference in the configuration of FIG. 5(b), since both the served and neighbor-channel subscriber units are equidistant from the base station. However, in the configuration of FIG. 5(c), power control will cause down-link neighbor-channel interference to decrease. Thus, as can be seen, power control is generally beneficial in the up-link direction, but can often result in increased neighbor-channel interference when used in the down-link direction.

Figure 6A:
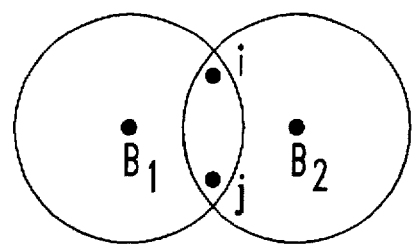
FIG. 6 illustrates schematically two neighboring cells, each with a base station, and with a served subscriber station and a potentially interfering subscriber station juxtaposed at various positions relative to each other and to the base stations.
Figure 6B:
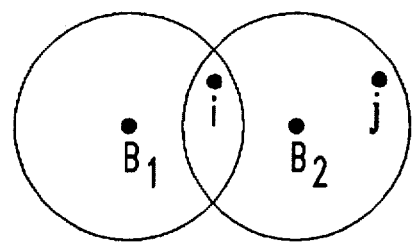
Figure 6C:
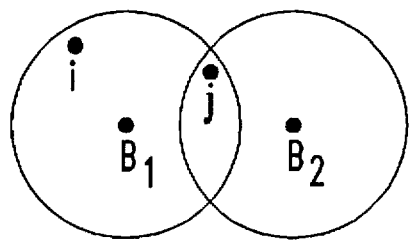

In the neighboring cells case shown in FIG. 6, and considering first the configuration of FIG. 6(a), subscriber unit i will experience neighbor-channel interference on both the down link (due to the competing signal from base station $B_2$ and the up link (due to the competing signal from subscriber station j). As will readily be seen from the figures, comparable neighbor-channel interference will be experienced on the down link in FIG. 6(b) and on the up link in FIG. 6(c), but the neighbor-channel interference will be negligible on the up link in FIG. 6(b) and on the down link in FIG. 6(c).

In the companion cross-referenced case designated as M. Benveniste-7 (Ser. No. 08/580,570) certain relationships were developed among channel separation (between a serving channel and an interfering neighbor channel), received signal strength for serving and for interfering channels and the S/I ratio. Those relationships were then applied for an illustrative wireless communications application to develop two tables relating the realized S/I ratio and channel separation for various levels of comparative signal strength between a serving and an interfering signal. Those tables, which provide a useful reference for the interference management methods described hereafter, are reproduced below and can be characterized as follows:

Table 1 provides a trade-off between the S/I ratio realized by a served subscriber, T, and channel spacing, w, based on a design co-channel S/I threshold of 18 dB. As will be seen the first column represents the channel spacing given in multiples of the channel bandwidth, while the remaining ten columns give the realized S/I ratio (in dB) for a served subscriber, for different values of a ratio of signal strengths (in dB) for an interfering to a serving signal, P, as experienced by the subscriber.

Similarly, Table 2 provides, for different channel spacing values w, the design co-channel S/I ratio, $T_c$, needed to achieve a target overall S/I ratio, T—i.e. a trade-off between $T_c$ and w for dB(T) equal to 18 dB.

TABLE 1

Trade-off between channel spacing and S/I ratio dB(T)

| Channel Spacing | $dB(T_c) = 18$ dB(P) | | | | | | | | | |
|---|---|---|---|---|---|---|---|---|---|---|
| w | -20 | -15 | -10 | -5 | 0 | 4 | 14 | 20 | 28 | 40 |
| 1 | 17.98 | 17.93 | 17.79 | 17.36 | 16.23 | 14.46 | 6.66 | 0.90 | -7.02 | -19.01 |
| 2 | 18.00 | 18.00 | 18.00 | 18.00 | 17.99 | 17.98 | 17.79 | 17.21 | 14.46 | 4.78 |
| 3 | 18.00 | 18.00 | 18.00 | 18.00 | 18.00 | 18.00 | 17.99 | 17.97 | 17.79 | 15.47 |
| 4 | 18.00 | 18.00 | 18.00 | 18.00 | 18.00 | 18.00 | 18.00 | 18.00 | 17.98 | 17.67 |
| 5 | 18.00 | 18.00 | 18.00 | 18.00 | 18.00 | 18.00 | 18.00 | 18.00 | 18.00 | 17.94 |

TABLE 2

Trade-off between channel spacing and co-channel S/I ratio $dB(T_c)$

| Channel Spacing | $dB(T) = 18$ dB(P) | | | | | | | | | |
|---|---|---|---|---|---|---|---|---|---|---|
| w | -20 | -15 | -10 | -5 | 0 | 4 | 14 | 20 | 28 | 40 |
| 1 | 18.02 | 18.07 | 18.22 | 18.75 | 21.03 | NA | NA | NA | NA | NA |
| 2 | 18.00 | 18.00 | 18.00 | 18.00 | 18.01 | 18.02 | 18.22 | 18.97 | NA | NA |
| 3 | 18.00 | 18.00 | 18.00 | 18.00 | 18.00 | 18.00 | 18.01 | 18.03 | 18.22 | 24.76 |
| 4 | 18.00 | 18.00 | 18.00 | 18.00 | 18.00 | 18.00 | 18.00 | 18.00 | 18.02 | 18.36 |
| 5 | 18.00 | 18.00 | 18.00 | 18.00 | 18.00 | 18.00 | 18.00 | 18.00 | 18.00 | 18.06 |

As noted earlier, in the case of no power control being applied and both subscriber units i and j being served by the same base station (i.e., the configuration of FIG. 5), the down-link interfering and serving signals will be comparable, because of the equal power with which each signal is transmitted from the base station. Thus, the ratio of the interfering signal to the serving signal, P, is equal to 1 and dB(P) is equal to 0. As will be seen from Table 1, if adjacent channel use were allowed, the S/I ratio would drop to 16.23 dB, which represents 67 percent of the target value of 63.1 (18 dB). Setting channel spacing w equal to 2 is sufficient to reclaim most of the S/I drop caused by neighbor-channel interference—an S/I ratio increase from 16.23 to 17.99 dB.

A comparable condition occurs when subscriber units i and j are served by different base stations if the serving subscriber unit i is near the common boundary between the two cells, regardless of the position of the interfering subscriber unit j, as illustrated in FIGS. 6(a) and 6(b). However, if subscriber unit i is further away from the interfering base station $B_2$ than from its serving base station $B_1$, as illustrated in FIG. 6(c), the P ratio will be less than 1, and dB(P) becomes negative. Thus the impact of adjacent channel use on the S/I ratio is less. For instance, at a dB(P) value of −5 dB, Table 1 shows that the realized S/I ratio will be 17.36 dB, which represents 86 percent of the design co-channel S/I ratio of 18 dB. For dB(P) equal to −10 dB, a 17.79 dB S/I ratio is realized, which represents 95 percent of the design co-channel S/I ratio. Alternatively, this can be characterized as the value realized by the S/I ratio if neighbor-channel interference is limited to 5 percent of the combined co-channel plus neighbor-channel interference. Accordingly, a value of P may be defined for which adjacent-channel interference becomes acceptable. That defined value is designated herein as $P_a$ and in the exemplary case described is equal to −10 dB.

Considering the trade-off between w and $T_c$ in Table 2, for the case of dB(P)=0, it can be seen that increasing the channel spacing from 1 to 2 would allow one to plan for a co-channel S/I ratio of 18.01 dB, instead of 21.03 dB. Additionally, it will be seen that, if the spacing were increased above 2, one would gain little in terms of the co-channel interference bound and, hence, in terms of capacity.

For the power control case, it has been shown that power control on the down link exacerbates the impact of neighbor-channel interference. Consider the particular case of power control being applied on the down link to reduce the signal strength of subscriber units closer in. In this case, P would be equal to the difference in power reduction of the signals serving the two subscriber units. The worst case occurs when the power of the signal serving subscriber unit i is reduced substantially, and the serving subscriber unit j operates at maximum power, as is illustrated by the configuration of FIG. 5(a). Table 1 shows that, even though the design co-channel S/I ratio is 18 dB, the realized S/I ratio becomes negative when down-link power is reduced by 28 dB for the near-end subscriber unit. It takes a channel spacing of 3 to achieve a 17.79 dB S/I ratio.

In Section B1 hereafter, a novel Mixed Power Control Methodology is disclosed which will permit the partial use of down-link power control without increasing channel spacing beyond the value of 2, while still maintaining a reasonable S/I ratio.

B. Neighbor-channel Interference Management Methodologies

In the sections following, three novel interference management methodologies are described which provide reduced neighbor channel interference relative to that achieved by prior art methods. These new interference management methodologies, each of which constitutes an embodiment of the invention, are designated as Mixed Power Control, Directed Assignment, and Mixed Power Control With Directed Assignment.

B1. Mixed Power Control

In the prior discussion of the relationship between the application (or non-application) of conventional power control methods and neighbor channel interference experienced by a served subscriber, it was shown that such interference varied with the direction of transmission (downlink or uplink) as well as with the location of the served subscriber unit relative to other nearby subscriber units, and to the serving and/or other nearby base stations. A novel mixed power control methodology is described below which significantly ameliorates those variations. As will be seen, this mixed power control methodology may be implemented independently, but it may also be incorporated with other novel interference management methodologies described herein and in the companion cross-referenced applications.

It is believed that this novel mixed power control methodology is better understood by separately treating the downlink and uplink cases and the description of the methodology is accordingly so divided.

(a) Downlink Power Control

It was shown in the general discussion of power control that application of a conventional power control policy on the down link—i.e., reduction of the received signal strength for those subscriber units nearer to the base station—exacerbates the impact of neighbor-channel interference. In such a case, the interfering-to-serving signal strength ratio, P (in dB), would be equal to the difference in power reduction of the signals serving the two subscriber units. The worst case occurs when the power of the signal serving subscriber unit i is reduced substantially, and the signal serving subscriber unit j operates at maximum power, as would be the case shown in FIG. 5(a). In the exemplary case reflected in Table 1, it can be seen that, even with a design co-channel S/I ratio of 18 dB, the realized S/I ratio becomes negative when down-link power is reduced by approximately 28 dB for the near-end subscriber unit where co-channel spacing is used—a realistic reduction in this configuration.

As shown hereafter, a reasonable S/I ratio can be achieved using power control and without increasing channel spacing beyond the value of 2—which is generally needed without power control—if the magnitude of power reduction is restricted. From Table 1 it can be seen that, when the difference in signal strengths between an interfering and a serving signal, P in dB, or equivalently, the relative difference in power reduction for the two subscriber units, is less than 14 dB, the impact on the S/I ratio is small: a 17.79 dB S/I ratio or better can be realized with a channel spacing of 2. Accordingly, by limiting power control so as to maintain the received signal strength for a served subscriber no more than 14 dB below the level, at the served subscriber location, of an interfering signal, a channel spacing of 2 can be maintained with negligible neighbor channel interference. This constraint on the relative power control differential is herein called the limiting power control ratio and will be reference from time to time by the designation: $\chi_M$. In the exemplary case depicted by Table 1, $dB(\chi_M)$ is −14 dB.

Figure 7A:
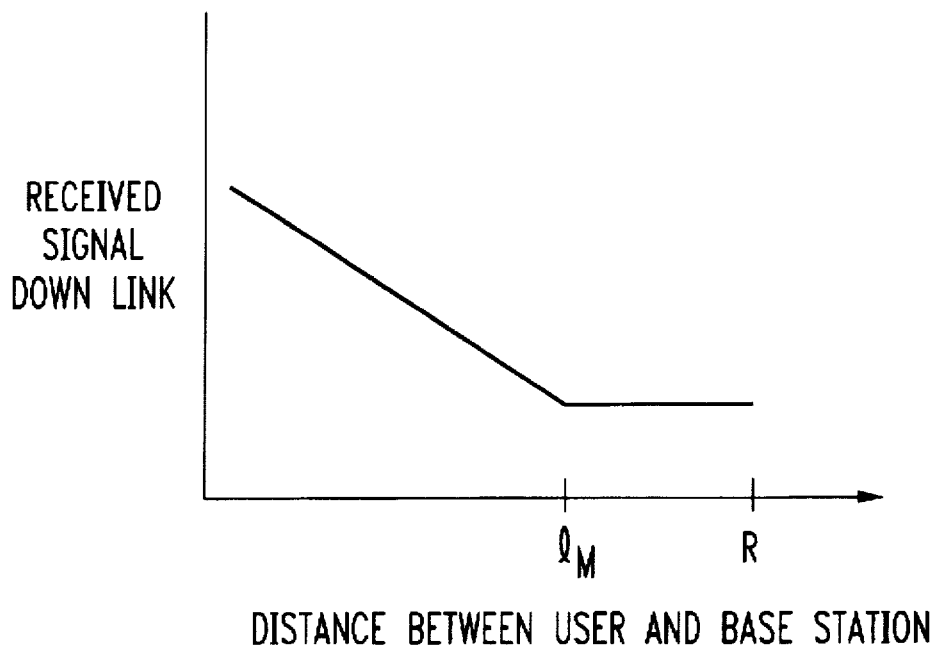
FIG. 7 provides a graphical depiction of the mixed power control policy of the invention.

In an illustrative embodiment of this mixed power control methodology, power control would be applied for subscriber units located between a cell's periphery and a point on the cell's radius where a signal reduced by $\chi_M$ equals the signal received at the cell's periphery. The distance along the cell's radius from the base station to the point at which a signal reduced by $\chi_M$ equals the signal received at the cell's periphery is defined as $l_M$. Thus power control would be applied for a subscriber unit located between $l_M$ and the cell periphery. FIG. 7A provides a graphical depiction of the down-link received signal as a function of the subscriber unit distance from the base station for this illustrative embodiment of the mixed power control methodology.

(b) Uplink Power Control

Unlike the downlink case, it has been seen that power control is generally helpful in reducing neighbor channel interference for the uplink direction. Nonetheless, as described hereafter, application of the mixed power control methodology of the invention for the uplink case permits the elimination of power control in certain regions of a cell without adversely affecting neighbor channel interference.

With up-link communications, the value of P can be reduced with power control and dB(P) becomes the difference in signal attenuation between the serving and interfering signals minus the difference in power reduction. This relationship and its impact can be illustrated by a configuration where the difference in signal attenuation between two subscriber units transmitting to a base station is 40 dB, and the difference in received signal levels due to power reduction is 12 dB. Then dB(P) would be: 40−12=28 dB. Based on a design co-channel S/I ratio of 18 dB and a channel spacing of 2, Table 1 shows that a 14.46 dB S/I ratio would be realized. If, on the other hand, the power reduction difference were increased to 26 dB, dB(P) would be 14 dB, and the total S/I ratio would be 17.79 dB, for a channel spacing of 2.

Figure 7B:
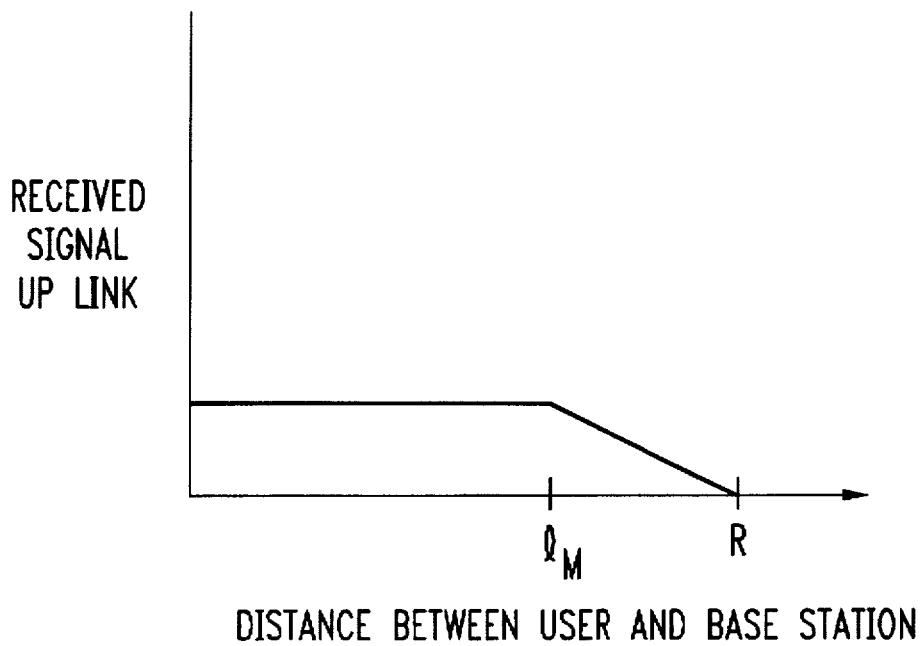

From this relationship it follows that, since negligible neighbor-channel interference will be caused by a dB(P) value of 14 dB or less with a channel spacing of 2, power control need not be applied to a potentially interfering subscriber unit experiencing high signal attenuation—e.g., a subscriber unit near the boundary of a cell. Only subscriber units with signal attenuation of 14 dB below the maximum possible attenuation in the cell need have their signals reduced. That is, power reduction need only be applied for subscriber units located between the base station and a point on the cell's radius, $l_M$, at which the ratio of the received signal strength relative to the minimum signal strength in the cell is $\chi_M^{-1}$.[4/] In the exemplary case of Table 1, dB($\chi_M^{-1}$) is 14 dB. FIG. 7B provides a graphical depiction of the up-link received signal as a function of the subscriber unit distance from the base station for this mixed power control methodology.

Of course, up-link power control may be applied between $l_M$ and the cell boundary if desired for other purposes. The point here is that up-link power control is not needed in this region for managing neighbor channel interference.

To estimate the power reduction capability needed on the up link with the mixed power control methodology, for a given channel spacing, the highest value of P to be encountered with some statistical significance is needed. The inventor has shown in a related article [M. Benveniste, "Managing Neighbor Channel Interference in Channelized Cellular Systems," forthcoming] that with a probability of 0.995, the relative signal strength dB(P) is less than or equal to 40 dB without power control if the propagation loss coefficient is 4 (a generally accepted value for mobile radio systems). Hence, a power reduction capability −dB($\phi^M$) of 26 dB would be adequate for a channel spacing of 2, since:

Maximum Attenuation (40)−dB(P)Threshold (14)=Maximum Power Reduction (26 dB).

As can be seen from Table 2, a range of power control options are presented. Examples of such options would include a reduction of the near-end subscriber unit's power by 20 dB while leaving the far-end subscriber unit at maximum power. For a channel spacing of 2, the design co-channel S/I threshold would have to be 18.97 dB. Another possibility would be a reduction of power at the near end by 26 dB (while operating the far end unit at maximum power). This would produce a dB(P) value of 14 (40−26), which for a channel spacing of 2 requires a design co-channel S/I threshold of 18.22 dB.

As will also be apparent, for the described embodiments of the mixed power control methodology, power control requirements are selected so that channel spacing requirements are minimum. Other applications of the methodology, of course, exist. For example, if a greater power reduction range is desirable, the channel spacing must increase. This idea is pertinent in dynamic channel assignment algorithms that employ power control as a means of increasing capacity.

B2. Directed Assignment

A surrogate for adjacent-channel interference is the number of adjacent-channel conflicts, which arise when two adjacent channels are used simultaneously in the same or abutting cells. While it will be apparent from the preceding discussion that not every adjacent-channel conflict gives rise to adjacent-channel interference, a generalization can still be made that a reduction in the number of adjacent-channel conflicts decreases the likelihood of adjacent-channel interference.

The embodiment of the invention described in this section is directed to an objective of minimizing adjacent channel interference through a reduction of the probability of adjacent channel conflicts. The approach may be applied to both regular and non-regular, fixed and flexible channel assignment, and to sectorized and omni-directional cells. It may also be combined with other adjacent-channel interference reduction approaches.

The Directed Assignment methodology will be understood by use of a simple example from regular fixed channel assignment. Consider four cells assigned channel sets: A, B, C, and D, as shown in FIG. 8. The channels comprising each set are adjacent to the channels of two of the other three sets, and the further assumption is made that each cell abuts cells assigned the other three channel sets. Consider further that for this illustrative example, there are 24 channels available, and the four cells in question have, respectively, 5, 3, 4, and 3 calls in progress each. If all calls were assigned to the lowest-number channels, as depicted in FIG. 8A, then there would be 4 adjacent channel conflicts in cell A, 3 in B, 3 in C, and 3 in D. In order to reduce the number of adjacent channel conflicts, all calls in cells A and C are moved to the lowest-number channels available, and the calls in cells B and D are moved to the highest-number channels, the configuration depicted in FIG. 8B. Consequently, there is a greater channel separation between active channels in cells containing adjacent channels. As seen in FIG. 8B, the number of adjacent channel conflicts decreases to: 2, 2, 1, and 2, for the four cells respectively.

The steps followed in carrying out the Directed Assignment methodology are as follows:

1. The available channels are distributed among channel sets so that each set has a label, "+" or "−", and any two sets with adjacent channels have opposite label.
2. Each cell is also assigned a label, "+" or "−".
3. A cell may use channels from a set(s) assigned the same label as the cell.

4. Cells with a "+" label assign their users to the lowest-number channel available, while cells with a "−" label place their users to the highest-number channel available.

Step 4 increases the channel separation of active channels in cells with opposite labels. Since adjacent channels can be found only in cells with opposite labels, by Step 1, the likelihood of adjacent-channel conflicts is decreased.

Two options are available to push calls to either end of a channel set. One would be to move the call from the highest-number channel in a "+" cell (or the call from the lowest-number channel in a "−" cell) to the channel of a departing call in that cell. Thus, there would be at most one channel re-arrangement per call termination or hand-off. Another way to keep users to the proper end of the channel set without channel re-arrangements would be to assign incoming calls to the lowest-number idle channel for a "+" cell, or to the highest-number idle channel for a "−" cell.

The Directed Assignment methodology applies both to fixed and flexible channel assignment. However, the interpretation of channel sets differs in the two approaches. In fixed channel assignment the channel sets are the mutually disjoint groups of channels dedicated to the different cells. In fixed regular channel assignment, where all channel sets are of equal size, Step 1 requires that there be an even number of channel sets.

In flexible channel assignment, there would be two channel sets, (in order to comply with adjacent channel use restrictions). Each would be assigned a "+" or "−" label. For example, the channel set of odd-number channels could be given the "+" label, and the set of even-number channels the "−" label. Since "+" label cells favor low channel numbers, and "−" label cells favor high channel numbers, the separation between the busy channels of cells with different labels increases in low traffic conditions. As adjacent channels may be used only in cells of different labels, the probability of adjacent channel conflicts is decreased.

B3. Mixed Power Control With Directed Assignment

Figure 9:
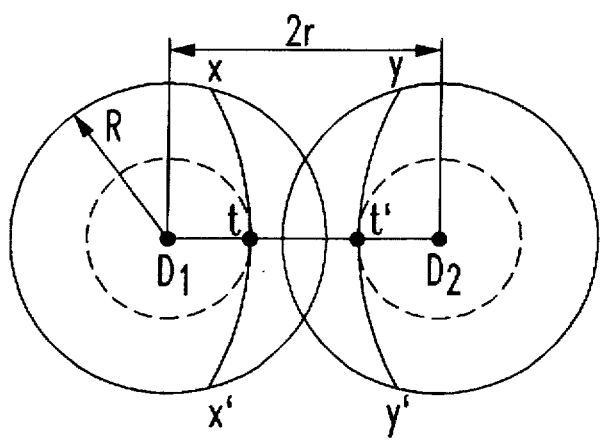
FIG. 9 depicts a no interference region in neighboring cells.

For a power control policy characterized by no power control on the down link, and full power control on the up link, it has been shown that a channel spacing of 2 would be adequate to reduce the impact of neighbor-channel interference within a cell with the use of that power control policy. In the companion cross-referenced application designated Benveniste-8 (Ser. No. 08/580,568), it was shown that, for such a power control policy, there is a region in a cell wherein the impact of adjacent-channel interference from a neighbor cell is negligible on the down link. Also, there is a similar region, wherein subscriber units will cause negligible up-link adjacent-channel interference to a neighbor cell. Specifically, with reference to FIG. 9 (which corresponds to FIG. 7 of the Benveniste-8 application), a subscriber unit positioned to the left of contour XX' in cell 1 would not experience downlink interference from adjacent channels used in cell 2. Similarly, a subscriber unit positioned to the right of contour YY' will not cause up-link adjacent channel interference to cell 1.

It has also been shown that the opposite power control practice—that is, full power control on the down link, and no power control on the up link—increases the neighbor-channel interference experienced from users within the same cell, and should be avoided. However, a novel power control policy, characterized as "mixed power control", was described in Section B1 which permits limited down-link power control while maintaining neighbor-channel interference within acceptable limits. Specifically, one could use power control on the down link outside a radius $l_M$, corresponding to a maximum power reduction range $\chi_M$—in the described illustrative case, $l_M$ is 0.4467 R, corresponding to a power reduction of 14 dB. Similarly, under the described mixed power control policy, if power control were applied on the up link only inside a radius $l_M$, the received signals would equalize at a level 14 dB above the lowest received signal in a cell. The received signal is plotted in FIG. 7 as a function of user-to-base-station distance (in log scale) for both communications directions. With this mixed power control policy, a channel spacing of 2 within a cell would be adequate.

Figure 10:
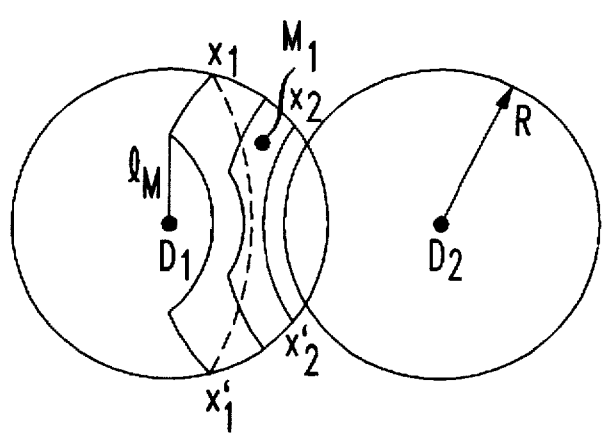
FIG. 10 depicts an application of the Mixed Power Control With Directed Assignment methodology of the invention.

As will be appreciated, the incentive for deviating from the pure power control policy is to reduce the impact of adjacent channel use in neighboring cells, and thus drop adjacent channel restrictions for neighboring cells. Consider an application of the above-described mixed power-control policy in the neighbor cell arrangement depicted in FIG. 9. Instead of the single contour XX', as shown in that figure, defining the region vulnerable to adjacent-channel interference from the neighboring cell, there will be a family of such contours $X_kX_k'$, one for each power level k used in the neighbor cell, as illustrated in FIG. 10. Contour $X_1X_1'$ corresponds to the strongest power signal used in cell 2. The contours $X_kX_k'$ spread both to the right and to the left of contour XX'. The shift to the right decreases the portion of users in cell 1 experiencing adjacent-channel interference from a user in cell 2 served at power level k, but the shift to left increases it. Now, however, users in the two cells can be matched to operate on adjacent channels in a way that reduces the likelihood of adjacent-channel interference.

To illustrate how user matching can reduce the probability of adjacent-channel interference, consider user $M_1$ in FIG. 10. Without power control, $M_1$ would experience adjacent-channel interference regardless of the position of the user on the adjacent channel. With power control, on the other hand, $M_1$ can be matched with a user in cell 2 served with a low power level k, so that there is no adjacent-channel interference. Hence, the probability of adjacent-channel interference can be reduced through a combination of limited power control and selective matching of adjacent channel users in neighbor cells. A channel matching algorithm for carrying out this objective is described below.

The range of power control determines the spread of the $X_kX_k'$ contours. The optimal range of power control that minimizes adjacent-channel interference probability should be determined in conjunction with the specific channel matching algorithm employed. It will be understood that the range of down-link power control cannot go beyond $\chi_M$.

As previously noted, the inventor has shown that the up-link requirements for achieving no adjacent-channel interference are symmetric to the down-link requirements described above if complementary power control policies are used on the two links. [M. Benveniste, "Managing Neighbor Channel Interference in Channelized Cellular Systems," id.] That is, if up-link power control is restricted inside the circle of radius $l_M$, and there is no power control outside that circle, then there would be a family of contours $Y_kY_k'$, for k corresponding to the different power levels of the users in cell 1, that define regions where a user in cell 2 would cause no up link interference to the corresponding user in cell 1. These contours are mirror images of the contours $X_kX_k'$ drawn for the down link case in cell 1. As also explained by the inventor in the reference article, a user that does not cause up-link adjacent-channel interference to an adjacent-channel user in a neighbor cell will not be subject to down link adjacent-channel interference from the neighbor-cell user. Due to the symmetry in the conditions for no adjacent-channel interference it is sufficient to analyze user-matching algorithms for one communication direction only. Accordingly, the described methodology in the following sections is focused on the down link. The performance on the up link will be comparable.

(a) Description of Methodology

As shown in the preceding section, the probability of adjacent-channel interference can be reduced by proper matching of adjacent-channel users in neighbor cells. The user matching problem is a complex combinatorial optimization problem. However a good solution of that problem is reached by a simple heuristic algorithm described hereafter.

The approach begins by ordering users in each cell. The ordered users are assigned the available channels in order of increasing (or decreasing) channel-number, thereby matching adjacent channel users. The objective thus becomes the determination of a criterion for ranking the users in a cell such as to minimize the probability of adjacent-channel interference. The user's distance from the serving base station is selected as the ranking criterion.

The logic for selecting the distance between user and base station as the ranking criterion can be seen by considering the two-cell example in FIG. 10. In the discussion hereafter, the following notation is used:

$m_i$ distance of subscriber unit $M_i$ from its own base station $n_i$ distance of subscriber unit $M_i$ from the neighbor base station In the inventor's referenced article, it is shown that, for the application of power control in the down-link direction, adjacent-channel interference will not be incurred when:

$$P = \left[ \frac{m_2}{n_1} \right]^{\gamma} \leq P_a$$

According to that relationship, in order to reduce down-link adjacent-channel interference in cell 1, high $m_2$ values should be matched with high $n_1$ values. Similarly, in order to minimize adjacent-channel interference in cell 2, high $m_1$ values should be matched with high $n_2$ values. But, in general, the channel assignments resulting from these two criteria will be different. To obtain a unique channel assignment, users in each cell must be ranked by the same criterion. If the distance from the serving base station is used, high $m_1$ values are matched with low $m_2$ values, and vice versa. Using distance as the ranking criterion decreases adjacent-channel interference because, in the area of cell 1 that is most vulnerable to adjacent-channel interference, $n_1$ decreases as $m_1$ increases, and vice versa.

The methodology of the invention can be generalized to deal with adjacent-channel use by more than one neighbor cells, as follows:

1. The available channels are distributed among channel sets so that each set has a label, "+" or "−", and any two sets with adjacent channels have opposite label.
2. Each cell is assigned a label, "+" or "−".
3. A cell may use channels from a set(s) assigned the same label as the cell.
4. Users in each cell are assigned in order of decreasing distance from the serving base station. Cells with a "+" label assign their users to the lowest-number channel first, while the cells with a "−" label place their users to the highest-number channel first.

Since adjacent channels are used only by cells of opposite label, by Steps 1 through 4, the assignment of high-power users to low-number channels in "+" cells, and to high-number channels in "−" cells, increases the channel separation between them. Consequently, a high-power user will operate either next to an idle channel (in low traffic conditions), or next to a channel assigned to a neighbor cell user near its base station. The probability of adjacent-channel interference between neighbor cells is thus reduced.

As will be seen, the methodology here resembles in some respects the previously described Directed Assignment methodology. However, while Directed Assignment has no impact on adjacent-channel interference in congestion conditions, the use of power control with proper user matching still reduces the probability of adjacent-channel interference.

As will be appreciated, the effectiveness of the matching procedure described above will depend on how spread out the contours $X_k X_k'$ are. This, in turn, depends on the range of power control, which is selected to minimize the probability of adjacent-channel interference.

As in the case of Directed Assignment, users can be packed on either end of the available channel set in two ways. One involves channel re-arrangement upon call departure; the other doesn't. Further channel re-arrangement may be necessary in order to maintain a proper ranking of the users, which may change as users move. Alternatively, channel re-arrangement may be postponed until adjacent-channel interference is observed, thus reducing the number of re-arrangements needed.

(b) Application of Methodology

The methodology described herein can be used with both fixed and flexible channel assignment. In this section exemplary applications of that methodology from fixed regular channel assignment are described. An example of the use of this method with flexible channel assignment appears in M. Benveniste, A. G. Greenberg, and P. E. Wright "On dynamic channel assignment in wireless systems: Extensions of Ordered Borrowing", forthcoming.

Figure 11:
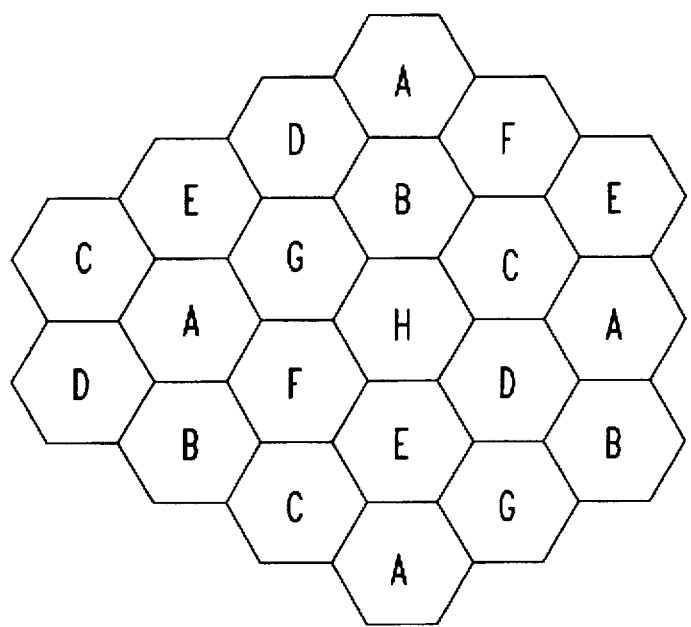
FIG. 11 depicts an N of 8 omni-directional cell layout.

Consider a system of omni-directional cells repeated by the N of 8 pattern shown in FIG. 11. The assumption is made that the channel sets are constructed by the horizontal method and, therefore, that each cell shares a border with one other cell assigned adjacent channels. Given 400 channels, each cell would be assigned 50 channels. Table 3 shows the impact of channel matching on adjacent-channel interference as a function of offered load. If channels were assigned randomly, it has been determined by simulation that the probability of an adjacent channel conflict (ACC) is 79 percent when offered a load of 40.3 erlangs (which gives a blocking probability of 2 percent). The probability of adjacent-channel interference (ACI) is 10.6 percent. When the Directed Assignment methodology is applied, the probability of adjacent channel conflict drops to 73 percent, and the probability of adjacent-channel interference becomes 10.1 percent, for the same offered load and blocking probability. If power control with user matching were used, the probability of adjacent-channel interference would be reduced to 0.5 percent.

TABLE 3

Performance of channel assignment methods for omni-directional cells with re-use factor 8

| Method | Offered Load (erlangs per cell) | | | | | |
|---|---|---|---|---|---|---|
| | 40.3(2% blocking) | | 49.6(10% blocking) | | 58.5 (20% blocking) | |
| | ACC Prob | ACI Prob | ACC Prob | ACI Prob | ACC Prob | ACI Prob |
| Random | 0.79 | 0.106 | 0.89 | 0.121 | 0.93 | 0.129 |
| DA | 0.73 | 0.101 | 0.88 | 0.120 | 0.93 | 0.129 |
| EPCDA | 0.73 | 0.005 | 0.88 | 0.019 | 0.93 | 0.028 |

When the offered load is increased to 58.5 erlangs (when the blocking probability increases to 20 percent), the probability of adjacent-channel conflict is 93 percent, and the probability of adjacent-channel interference is 12.9 percent, when channels are assigned randomly. With Directed Assignment, the probability of adjacent-channel conflict remains 93 percent, and the probability of adjacent-channel interference becomes 12.8 percent, for the same offered load. As anticipated, the impact of Directed Assignment diminishes in congestion. If power control with user matching are used, the probability of adjacent-channel interference drops to 2.8 percent.

Figure 12:
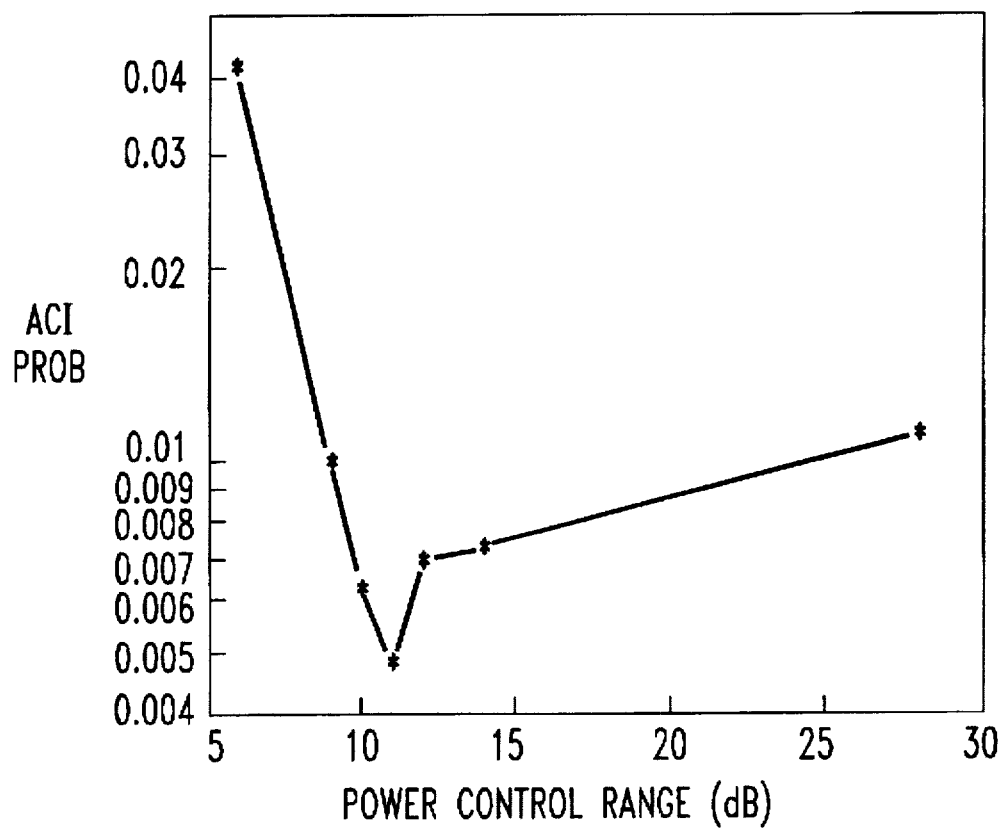
FIG. 12 shows the probability of adjacent channel interference as a function of power control range for the Mixed Power Control With Directed Assignment methodology of the invention.

A power range of 11 dB was used in obtaining the above results. This value yields the lowest adjacent-channel interference probability for an offered load of 40.3 erlangs per cell, as seen in FIG. 12, where adjacent-channel interference probability is plotted as a function of power control range.

II. CONCLUSION

Herein has been disclosed a plurality of novel methodologies for managing neighbor-channel interference. These methods, and combinations thereof, can be employed with fixed and flexible, regular and non-regular channel assignment. And, they are applicable to all channelized systems whether they employ frequency-division multiple access or hybrid frequency-division/ time-division multiple access.

As shown in the discussion, the methods disclosed herein can be easily combined, as well as being combinable with embodiments of the inventions claimed in the cross-referenced companion applications. An example that illustrates the potential for synergy among the several disclosed channel management methodologies even better is that of a cellular system on an irregular grid, with a non-uniform traffic distribution, comprised of a mix of sectorized and omni-directional cells. An objective is to find an optimal non-regular channel assignment that respects adjacent channel restrictions. Odd/even Cell Designation (from companion application M.Benveniste-7) can be used to ensure compliance with adjacent channel restrictions within a cell. Mixed Power Control with Directed Assignment will reduce adjacent channel interference between neighbor cells. And Vertical Channel-Set Construction (from companion application M.Benveniste-7) will ensure that sectors of the same cell do not use adjacent channels. Finally, any channel borrowing scheme that uses channels according to a cell's odd/even designation and a sector's orientation can make this channel assignment dynamic, without violating adjacent channel restrictions.

Although the present embodiment of the invention has been described in detail, it should be understood that various changes, alterations and substitutions can be made therein without departing from the spirit and scope of the invention as defined by the appended claims.

I claim:

1. A method of managing interference in a wireless communications network having service areas partitioned into a plurality of cells; wherein a plurality of communications channels are available for allocation among said cells said method comprising the steps of:

causing each of said available channels to be assigned a label corresponding to one of at least two mutually disjoint categories, wherein no two adjacent channels are labeled with a same category;

causing each of said cells to use channels that have been assigned a common label; and assigning said channels to users in each of said cells in conjunction with an application of power control wherein high power users are assigned to low number channels in a first set of labeled cells and to high-number channels in a second set of labeled cells.

2. The method of managing interference of claim 1 wherein said step of causing channels to be assigned is carried out by distributing said available channels among a plurality of channel sets so that each set is assigned a label corresponding to said one of at least two mutually disjoint categories, and whereby no two sets with adjacent channels are labelled with a same category.

3. The method of managing interference of claim 2 wherein said step of causing cells to use commonly labeled channels is carried out by causing each said cell to use channels selected only from one or more of said channel sets assigned a common label.

4. A storage means fabricated to contain a model for managing interference in a wireless communications network, said model carrying out essentially the steps of the method for managing such interference of claim 1.

5. A method of managing interference in a wireless communications network having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label; and assigning said channels to users in each of said cells according to a constraint that, for cells with a label corresponding to a first of said mutually disjoint categories, said cells' users are assigned to a lowest-number channel available, and for cells with a label corresponding to a second of said mutually disjoint categories, said cells' users are assigned to a highest-number channel available.

6. A method of managing interference in a wireless communications network having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label;

assigning said channels to users in each of said cells according to a constraint that, for cells with a label corresponding to a first of said mutually disjoint categories, said cells' users are assigned to a lowest-number channel available, and for cells with a label corresponding to a second of said mutually disjoint categories, said cells' users are assigned to a highest-number channel available;

assigning channels to users in each one of said cells in conjunction with an application of power control for transmissions to and from mobile units served by a central transmission site subject to the following constraints;

for transmissions from a central transmission site to a mobile unit ("down-link") said power control is applied only as to mobile users located beyond a distance from said transmission site; and for transmissions from a mobile unit to a central transmission site ("up-link") said power control is applied only as to mobile units located within a radial distance for said central transmission site;

wherein each said radio distance is determined so as to achieve an acceptable level of interference and is utilized in the assignment of high power users to low-number channels in said first labeled cells and to high-number channels in said second labeled calls.

7. A method of managing interference in a wireless communications network having service areas partitioned into a plurality of cells; wherein a plurality of communications channels are available for allocation among said cells, said method comprising the steps of:

causing each of said available channels to be assigned a label corresponding to one of at least two mutually disjoint categories, wherein no two adjacent channels are labeled with a same category;

causing each of said cells to use channels that have been assigned a common label; and assigning said channels to users in each of said cells in conjunction with an application of power control wherein high power users are assigned to low number channels in a first set of labeled cells and to high-number channels in a second set of labeled cells; and further assigning channels to users in each cell in order of decreasing distance from each of said user's base station, subject to a constraint that for cells with a label corresponding to a first of one of said mutually disjoint categories, said cells' users are assigned to a lowest-number channel available, and for cells with a label corresponding to a second one of said mutually disjoint categories, said cells' users are assigned to a highest-number channel available.

8. A method of managing interference in a wireless communications network having service areas partitioned into a plurality of cells; wherein a plurality of communications channels are available for allocation among said cells, said method comprising the steps of:

causing each of said available channels to be assigned a label corresponding to one of at least two mutually disjoint categories, wherein no two adjacent channels are labeled with a same category;

causing each of said cells to use channels that have been assigned a common label;

assigning said channels to users in each of said cells in conjunction with an application of power control wherein power control is applied for downlink transmissions from a central transmission site only to mobile units located beyond a radial distance from said central transmission site, said radial distance being determined so as to achieve an acceptable level of interference; and wherein high power users are assigned to low number channels in a first set of labeled cells and to high-number channels in a second set of labeled cells.

9. A method of managing interference in a wireless communications network having service areas partitioned into a plurality of cells; wherein a plurality of communications channels are available for allocation among said cells, said method comprising the steps of:

causing each of said available channels to be assigned a label corresponding to one of at least two mutually disjoint categories, wherein no two adjacent channels are labeled with a same category;

causing each of said cells to use channels that have been assigned a common label;

assigning said channels to users in each of said cells with an application of power control wherein power control is applied for uplink transmissions from a mobile unit to a central transmission site only to mobile units located within a radial distance from said central transmission site, said radial distance being determined so as to achieve an acceptable level of interference; and wherein high power users are assigned to low number channels in a first set of labeled cells and to high-number channels in a second set of labeled cells.

10. A method of managing interference in a wireless communications network having service areas partitioned into a plurality of cells; wherein a plurality of communications channels are available for allocation among said cells, said method comprising the steps of:

causing each of said available channels to be assigned a label corresponding to one of at least two mutually disjoint categories, wherein no two adjacent channels are labeled with a same category;

causing each of said cells to use channels that have been assigned a common label; and assigning said channels to users in each of said cells in conjunction with an application of power control wherein high power users are assigned to low number channels in a first set of labeled cells and to high-number channels in a second set of labeled cells; and further rearranging the channel assignments within a cell upon a departure of a mobile unit from said cell by method steps used in the initial channel assignments.

11. A method of managing interference in a wireless communications network having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label; and assigning said channels to users in each of said cells according to a constraint that, for cells with a label corresponding to a first one of said mutually disjoint categories, said cells' users are assigned to a lowest number channel available and for cells with a label corresponding to a second one of said mutually disjoint categories, said cells' users are assigned to a highest-number channel available and assigning channels to users in each cell in order of decreasing distance from each of said user's serving base station, starting at an end of the spectrum opposite the one end of the assigned spectrum.

12. A method of managing interference in a wireless communications network having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label; and assigning said channels to users in each of said cells according to a constraint that, for cells with a label corresponding to a first one of said mutually disjoint categories, said cells' users are assigned to a lowest number channel available and for cells with a label corresponding to a second one of said mutually disjoint categories, a label corresponding to a second of said mutually disjoint categories, said cells' users are assigned to a highest-number channel available and assigning channels to users in each cell in order of decreasing distance from each of said user's serving base station, starting at an end of the spectrum opposite the one end of the assigned spectrum, and the assigning of channels being carried out by distributing said available channels among a plurality of channel sets so that each one of said sets is assigned a label corresponding to said one of two mutually disjoint categories, and whereby no two sets with adjacent channels are labeled with a same category.

13. A method of managing interference in a wireless communications network having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label; and assigning said channels to users in each of said cells according to a constraint that, for cells with a label corresponding to a first one of said mutually disjoint categories, said cells' users are assigned to a lowest number channel available and for cells with a label corresponding to a second one of said mutually disjoint categories, a label corresponding to a second of said mutually disjoint categories, said cells' users are assigned to a highest-number channel available and assigning channels to users in each cell in order of decreasing distance from each of said user's serving base station, starting at an end of the spectrum opposite the one end of the assigned spectrum, and the assigning of channels being carried out by distributing said available channels among a plurality of channel sets so that each one of said sets is assigned a label corresponding to said one of two mutually disjoint categories, and whereby no two sets with adjacent channels are labeled with a same category, and wherein the step of causing cells to use commonly labeled channels is carried out by causing each of said cells to use channels selected only from one or more of said channel sets assigned a common label.

14. A method of managing interference in a wireless communications network having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label; and assigning said channels to users in each of said cells according to a constraint that, for cells with a label corresponding to a first one of said mutually disjoint categories, said cells' users are assigned to a lowest number channel available and for cells with a label corresponding to a second one of said mutually disjoint categories, said cells' users are assigned to a highest-number channel available and assigning channels to users in each cell in order of decreasing distance from each of said user's serving base station, starting at an end of the spectrum opposite the one end of the assigned spectrum, and the assigning of channels being carried out by distributing said available channels among a plurality of channel sets so that each one of said sets is assigned a label corresponding to said one of two mutually disjoint categories, and whereby no two sets with adjacent channels are labeled with a same category; and rearranging the channel assignments within a cell upon a departure of a mobile unit from said cell by method steps used in the initial channel assignments.

15. A storage means fabricated to contain a model for managing interference in a wireless communications network said model having instructions for having service areas partitioned into a plurality of cells, wherein a plurality of communications channels are available for allocation among said cells, said method comprising the steps of:

causing each of said available channels to be assigned a label corresponding to one of two mutually disjoint categories, wherein no two adjacent channels are labeled with a same category;

causing each of said cells to use channels that have been assigned a common label; and assigning said channels to users in each of said cells according to a constraint that, for cells with a label corresponding to a first one of said mutually disjoint categories, said cells' users are assigned to a lowest number channel available and for cells with a label corresponding to a second one of said mutually disjoint categories, said cells' users are assigned to a highest-number channel available and assigning channels to users in each cell in order of decreasing distance from each of said user's serving base station, starting at an end of the spectrum opposite the one end of the assigned spectrum.

* * * * *